United States Patent
Ikeda et al.

(10) Patent No.: US 11,354,794 B2
(45) Date of Patent: Jun. 7, 2022

(54) DEPOSIT DETECTION DEVICE AND DEPOSIT DETECTION METHOD

(71) Applicant: DENSO TEN Limited, Kobe (JP)

(72) Inventors: Nobuhisa Ikeda, Kobe (JP); Nobunori Asayama, Kobe (JP); Takashi Kono, Kobe (JP); Yasushi Tani, Kobe (JP); Daisuke Yamamoto, Kobe (JP); Daisuke Shiota, Kobe (JP); Teruhiko Kamibayashi, Kobe (JP)

(73) Assignee: DENSO TEN Limited, Kobe (JP)

( * ) Notice: Subject to any disclaimer, the term of this patent is extended or adjusted under 35 U.S.C. 154(b) by 120 days.

(21) Appl. No.: 17/017,852

(22) Filed: Sep. 11, 2020

(65) Prior Publication Data

US 2021/0090235 A1    Mar. 25, 2021

(30) Foreign Application Priority Data

Sep. 20, 2019    (JP) .............................. JP2019-172203

(51) Int. Cl.
*G06T 7/00*    (2017.01)
*G06T 7/11*    (2017.01)

(52) U.S. Cl.
CPC .............. *G06T 7/0002* (2013.01); *G06T 7/11* (2017.01); *G06T 2207/30168* (2013.01); *G06T 2207/30252* (2013.01)

(58) Field of Classification Search
CPC ......... G06T 2207/30252; G06T 7/0002; G06T 7/12; G06T 7/11; G06T 7/13; G06K 9/00791; G06K 9/4647; G06K 9/3233; G06K 9/4661
See application file for complete search history.

(56) References Cited

U.S. PATENT DOCUMENTS

| | | | |
|---|---|---|---|
| 2014/0010408 A1* | 1/2014 | Irie ....................... | G06T 7/0002 382/103 |
| 2014/0028849 A1* | 1/2014 | Tsuchiya .................. | B60R 1/00 348/148 |
| 2014/0029008 A1* | 1/2014 | Hirai .................... | G01N 21/552 356/445 |

(Continued)

FOREIGN PATENT DOCUMENTS

JP    2018-072312 A    5/2018

OTHER PUBLICATIONS

You, Shaodi, et al. "Adherent raindrop modeling, detectionand removal in video." IEEE transactions on pattern analysis and machine intelligence 38.9 (2015): 1721-1733.*

*Primary Examiner* — Li Liu
(74) *Attorney, Agent, or Firm* — Oliff PLC

(57) ABSTRACT

A deposit detection device according to an embodiment includes an extraction module and an exclusion module. The extraction module extracts a candidate region for a deposit from a captured image captured by an imaging device. The exclusion module excludes from the candidate region a region that satisfies a predetermined exception condition. The exclusion module excludes from the candidate region a region that satisfies a first exception region when adhesion of a deposit to the imaging device is not detected, and excludes from the candidate region a region that satisfies a second exception condition different from the first exception condition when adhesion of the deposit to the imaging device is detected.

8 Claims, 10 Drawing Sheets

(56) References Cited

U.S. PATENT DOCUMENTS

2016/0100088 A1* 4/2016 Sekiguchi .............. G06K 9/209
                                                        701/48
2018/0114089 A1* 4/2018 Ikeda ........................ B60R 1/00
2021/0122294 A1* 4/2021 Mandai ................... G06T 7/001

* cited by examiner

| | | POSITION | | | | | | |
|---|---|---|---|---|---|---|---|---|
| | | D1 | D2 | D3 | D4 | D5 | D6 | D7 |
| AMOUNT OF CHANGE | MAXIMUM | +2 | +1 | +1 | 0 | -1 | -1 | -1 |
| | MINIMUM | +1 | +1 | +1 | 0 | -1 | -1 | -1 |

DEPOSIT REGION IF AMOUNT OF CHANGE IS WITHIN THRESHOLD VALUE RANGE

| | POSITION | | | | | | |
|---|---|---|---|---|---|---|---|
| | D1 | D2 | D3 | D4 | D5 | D6 | D7 |
| AMOUNT OF CHANGE | +1 | +1 | +1 | 0 | -1 | -1 | -1 |

| | | POSITION | | | | | | |
|---|---|---|---|---|---|---|---|---|
| | | D1 | D2 | D3 | D4 | D5 | D6 | D7 |
| AMOUNT OF CHANGE | MAXIMUM | +2 | +1 | -1 | -1 | - | - | - |
| | MINIMUM | +1 | +1 | -1 | -2 | - | - | - |

DEPOSIT DETECTION DEVICE AND DEPOSIT DETECTION METHOD

CROSS-REFERENCE TO RELATED APPLICATION

This application is based upon and claims the benefit of priority of the prior Japanese Patent Application No. 2019-172203, filed on Sep. 20, 2019, the entire contents of which are incorporated herein by reference.

FIELD

The embodiments discussed herein are directed to a deposit detection device and a deposit detection method.

BACKGROUND

Conventionally, a deposit detection device is known which performs image analysis for a candidate region assumed to include a deposit and excludes a part of the candidate region (for example, refer to Japanese Laid-open Patent Publication No. 2018-72312).

Unfortunately, the conventional technique has room for improvement in detecting a deposit stably. For example, a candidate region corresponding to a region in which adhesion of a deposit is once identified in the past image may be erroneously excluded, and deposit detection may be unstable.

SUMMARY

A deposit detection device according to an embodiment includes an extraction module and an exclusion module. The extraction module extracts a candidate region for a deposit from a captured image captured by an imaging device. The exclusion module excludes from the candidate region a region that satisfies a predetermined exception condition. The exclusion module excludes from the candidate region a region that satisfies a first exception region when adhesion of a deposit to the imaging device is not detected, and excludes from the candidate region a region that satisfies a second exception condition different from the first exception condition when adhesion of the deposit to the imaging device is detected.

DESCRIPTION OF EMBODIMENTS

A deposit detection device and a deposit detection method according to an embodiment will be described in detail below with reference to the accompanying drawings. It should be noted that the present invention is not limited by the embodiment.

Figure 1:
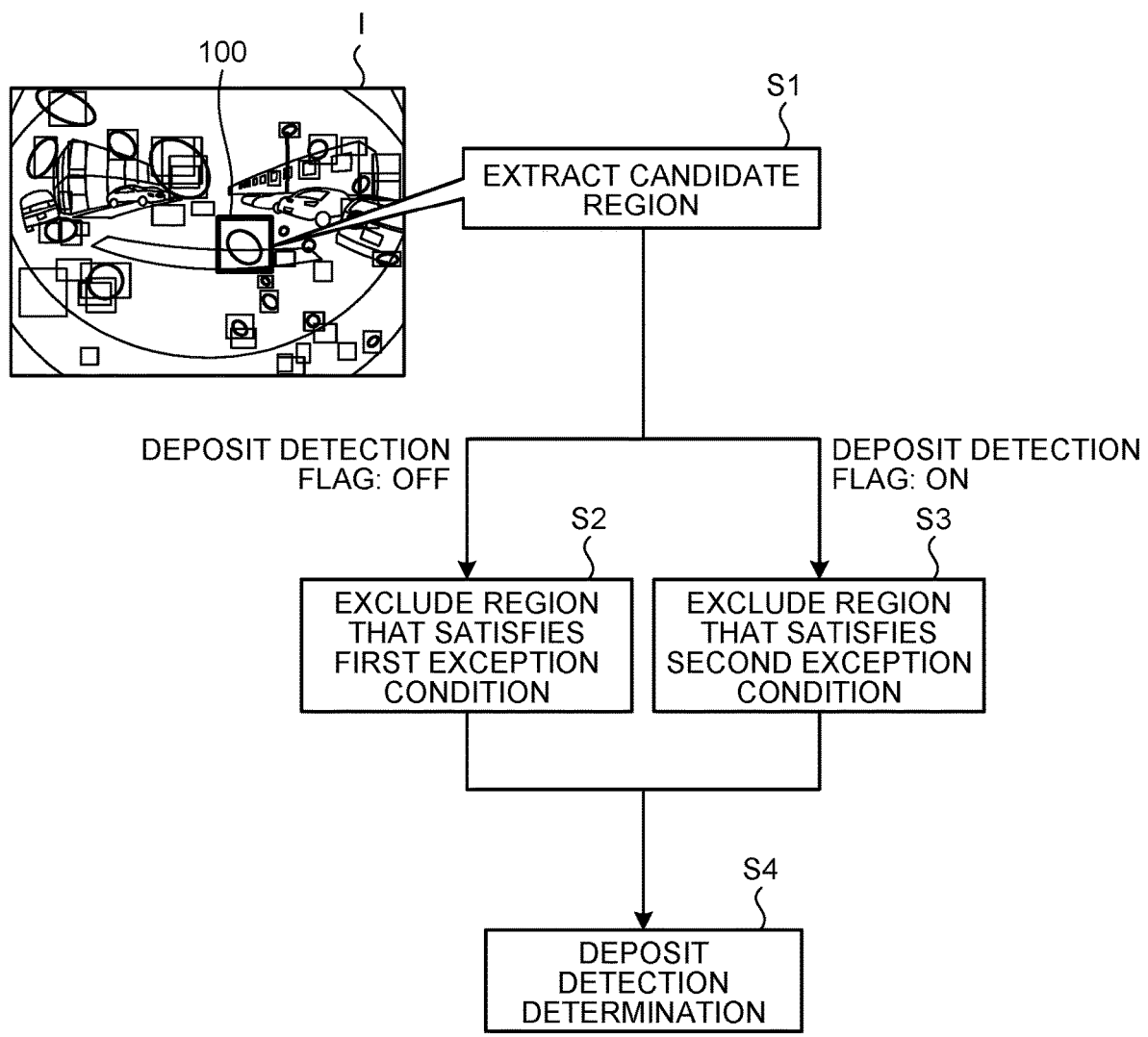
FIG. 1 is a diagram illustrating an overview of a deposit detection method.

First, referring to FIG. 1, an overview of the deposit detection method according to the embodiment will be described. FIG. 1 is a diagram illustrating the overview of the deposit detection method. The deposit detection method according to the embodiment is performed by a deposit detection device 1 (refer to FIG. 2). FIG. 1 illustrates a captured image I captured, for example, in a state in which a deposit such as a water droplet adheres to a lens of a camera 10 (refer to FIG. 2) that is an imaging device. Deposits may include dirt, dust, and a snowflake and may be any deposit that blurs the region of the deposit.

The deposit detection device 1 determines that a deposit adheres to the lens of the camera 10 when an occupancy ratio that is the ratio of the area occupied by an identified region in which a deposit adheres to a predetermined target region set in the captured image I is equal to or larger than a preset threshold value (for example, 40%). The target region may be the entire captured image I or may be a partial region. The deposit detection device 1 determines that a deposit does not adhere to the lens of the camera 10 when the occupancy ratio is smaller than the threshold value.

The identified region, which will be described in detail later, is detected by excluding a region that satisfies a predetermined exception condition from a candidate region 100 in which a deposit may adhere. Hereinafter, the region excluded from the candidate region 100 may be referred to as "exclusion region".

Conventionally, when the exclusion region is excluded from the candidate region 100, the exclusion region is excluded from the candidate region 100 under the same exception condition, irrespective of whether a deposit adheres to the lens.

However, it has been found that although it is once determined that a deposit adheres to the lens and the deposit actually adheres, some regions are excluded as exclusion regions from the candidate region 100, depending on the state of the captured image I. Consequently, adhesion determination for a deposit on the lens may be frequency changed, and deposit detection may be unstable.

The deposit detection device 1 according to the embodiment then performs the deposit detection method to enable stable deposit detection.

Specifically, the deposit detection device 1 according to the embodiment extracts a candidate region 100 that is a candidate for a deposit region corresponding to a deposit adhering to the lens, based on edges detected from the pixels of the captured image I captured by the camera 10 (S1).

The deposit detection device 1 then excludes from the candidate region 100 an exclusion region that satisfies a first exception condition when a deposit detection flag is "OFF" (S2). The deposit detection flag is "OFF" when it is not determined that a deposit adheres to the lens of the camera 10, and is "ON" when it is determined that a deposit adheres to the lens of the camera 10. The first exception condition will be described later.

The deposit detection device 1 excludes from the candidate region 100 an exclusion region that satisfies a second exception condition different from the first exception condition when the deposit detection flag is "ON" (S3). The second exception condition will be described later.

The deposit detection device 1 thus excludes the exclusion regions from the candidate region 100 under the different exception conditions, based on the deposit detection flags, and performs deposit detection determination using the remaining candidate region 100 (S4).

For example, when the deposit detection flag is "ON", the deposit detection device 1 relaxes the exception condition, compared with when the deposit detection flag is "OFF", and excludes an exclusion region from the candidate region 100. That is, when the deposit detection flag is "ON", the deposit detection device 1 excludes the candidate region 100 less than when the deposit detection flag is "OFF".

When it is determined that a deposit adheres to the lens, the deposit detection device 1 does not exclude many candidate regions 100 under a strict exception condition and relaxes the adhesion determination for a deposit, thereby maintaining a state in which a deposit is detected. The deposit detection device 1 thus suppresses frequent changing of the adhesion determination for a deposit on the lens and enables stable deposit detection.

Figure 2:
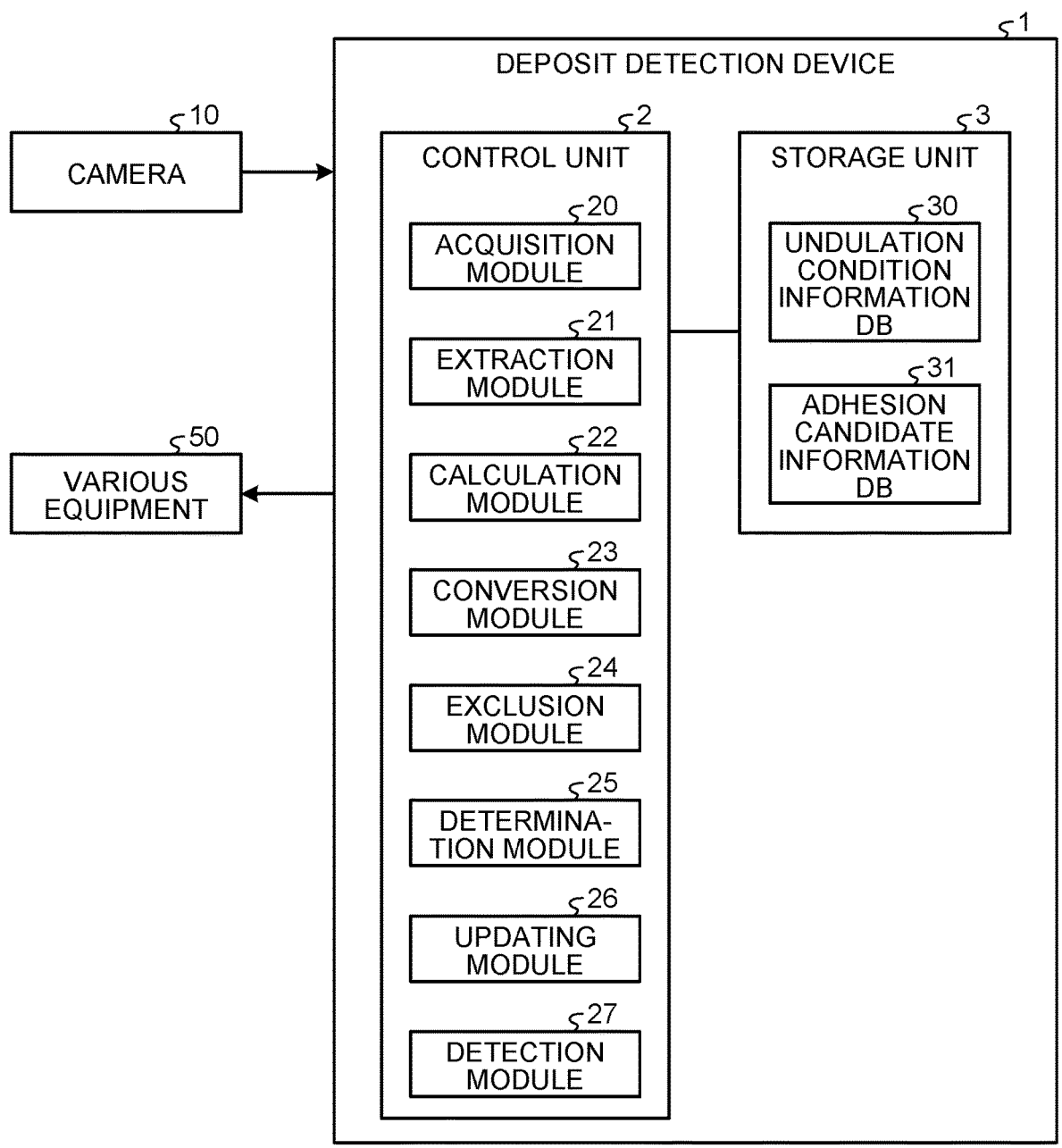
FIG. 2 is a block diagram illustrating a configuration of a deposit detection device.

A configuration of the deposit detection device 1 according to an embodiment will now be described with reference to FIG. 2. FIG. 2 is a block diagram illustrating the configuration of the deposit detection device 1. As illustrated in FIG. 2, the deposit detection device 1 according to an embodiment is connected with the camera 10 and various equipment 50. Although the deposit detection device 1 illustrated in FIG. 2 is a separate component from the camera 10 and the various equipment 50, the deposit detection device 1 may be integrated with at least one of the camera 10 and the various equipment 50.

The camera 10 is, for example, an on-vehicle camera including a lens such as a fish-eye lens and an imager such as a charge-coupled device (CCD) or a complementary metal oxide semiconductor (CMOS). The cameras 10 are provided, for example, at positions where images at the front, back, and sides of the vehicle can be captured, and output the captured images I to the deposit detection device 1.

The various equipment 50 acquires the detection result from the deposit detection device 1 to perform a variety of control on the vehicle. The various equipment 50 includes, for example, a display device indicating that a deposit adheres to the lens of the camera 10 and notifies the user of an instruction to wipe off the deposit, a removal device that ejects fluid, gas, or the like toward the lens to remove the deposit, and a vehicle control device for controlling autonomous driving, for example.

The deposit detection device 1 includes a control unit 2 and a storage unit 3. The control unit 2 includes an acquisition module 20, an extraction module 21, a calculation module 22, a conversion module 23, an exclusion module 24, a determination module 25, an updating module 26, and a detection module 27. The storage unit 3 stores therein an undulation condition information DB 30 and an adhesion candidate information DB 31.

Here, the deposit detection device 1 includes, for example, a computer having a central processing unit (CPU), a read-only memory (ROM), a random-access memory (RAM), a data flash, and an input-output port, and a variety of circuits.

The CPU of the computer reads and executes a computer program stored in the ROM, for example, to function as the acquisition module 20, the extraction module 21, the calculation module 22, the conversion module 23, the exclusion module 24, the determination module 25, the updating module 26, and the detection module 27 of the control unit 2.

At least one or all of the acquisition module 20, the extraction module 21, the calculation module 22, the conversion module 23, the exclusion module 24, the determination module 25, the updating module 26, and the detection module 27 of the control unit 2 may be configured with hardware such as application-specific integrated circuit (ASIC) and field-programmable gate array (FPGA). The acquisition module 20, the extraction module 21, the calculation module 22, the conversion module 23, the exclusion module 24, the determination module 25, the updating module 26, and the detection module 27 may be integrated or divided into a plurality of units.

The storage unit 3 corresponds to, for example, the RAM and the data flash. The RAM and the data flash can store therein information of a variety of computer programs. The deposit detection device 1 may acquire the computer program and/or a variety of information described above through another computer connected via a wired or wireless network or a portable recording medium.

The undulation condition information DB 30 stores therein undulation condition information. The undulation condition information is information including a condition serving as a criterion in a determination process by the determination module 25 described later and includes, for example, a pattern condition of undulation of a brightness distribution. The pattern condition is, for example, a shape pattern of undulation obtained when a brightness distribution is mapped and a pattern of data rows of brightness in a brightness distribution. The determination process using the undulation condition information will be described later.

The adhesion candidate information DB 31 stores therein adhesion candidate information of a candidate region 100 in the past captured image I in which a deposit was detected. The adhesion candidate information is rectangular information of the candidate region 100 and undulation information of a brightness distribution of the candidate region 100.

The rectangular information is information indicating the position and the size of the candidate region 100 in the captured image I. The rectangular information is the X coordinate and the Y coordinate on the upper left of the candidate region 100 and the width and the height of the candidate region 100. The X coordinate and the Y coordinate are set such that predetermined coordinates in the captured image I are set as the origin. The predetermined coordinates are set at the same position in the captured images I.

The undulation information of a brightness distribution is a pattern of undulation change in brightness distribution in the candidate region 100. The pattern of undulation change in brightness distribution will be described later. The rectangular information and the undulation information of a brightness distribution are stored to be linked to each other.

The acquisition module 20 acquires an image captured by the camera 10 and generates (acquires) a current frame that is the captured image I at present. Specifically, the acquisition module 20 performs a gray-scale process of converting each pixel in the acquired image into grayscale gradation from white to black according to its brightness. The acquisition module 20 also performs a pixel thinning process on the acquired image and generates an image having a size smaller than the acquired image.

The acquisition module 20 generates a current frame that is an integrated image of the sum and the sum of squares of pixel values in the pixels, based on the image subjected to the thinning process. As used herein, a pixel value is information corresponding to brightness or an edge of a pixel. In this way, the deposit detection device 1 can accelerate calculation in the processes in the subsequent stages by performing the thinning process on the acquired image and generating the integrated image and can reduce the process time for detecting a deposit.

The acquisition module 20 may perform a smoothing process for each pixel, using a smoothing filter such as an averaging filter. The acquisition module 20 does not necessarily perform the thinning process and may generate a current frame having the same size as that of the acquired image.

The extraction module 21 extracts the candidate region 100 from the captured image I acquired by the acquisition module 20. Specifically, first, the extraction module 21 extracts brightness and edge information of each pixel in the captured image I. The brightness of each pixel is represented by, for example, a parameter from 0 to 255.

The extraction module 21 performs an edge detection process based on the brightness of each pixel to detect an edge in an X-axis direction (the right-left direction in the captured image I) and an edge in a Y-axis direction (the top-bottom direction in the captured image I) for each pixel. In the edge detection process, for example, any edge detection filter such as a Sobel filter and a Prewitt filter can be used.

The extraction module 21 then detects a vector including information on the edge angle and the edge intensity of the pixel as edge information, using a trigonometric function, based on the edge in the X-axis direction and the edge in the Y-axis direction. Specifically, the edge angle is represented by the direction of the vector and the edge intensity is represented by the length of the vector.

The extraction module 21 then performs a matching process (template matching) between template information indicating the profile of a deposit created in advance and the detected edge information and extracts edge information similar to the template information. The extraction module 21 then extracts the candidate region 100 that is a region with the extracted edge information, that is, a rectangular region including the profile of a deposit.

Figure 3:
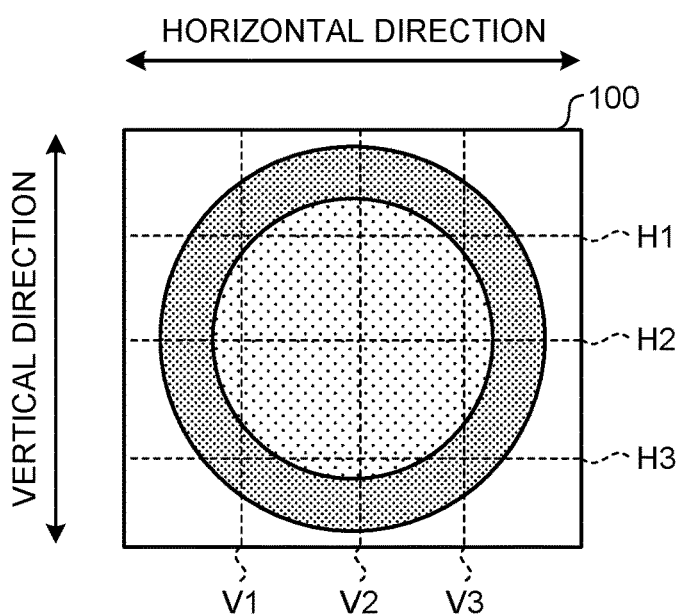
FIG. 3 is a diagram illustrating pixel rows from which a brightness distribution is to be extracted.

The extraction module 21 extracts a brightness distribution of predetermined pixel rows in the candidate region 100. Specifically, the extraction module 21 extracts a brightness distribution of predetermined pixel rows in the candidate region 100 from which the exclusion region has been excluded. FIG. 3 is a diagram illustrating pixel rows from which a brightness distribution is to be extracted. As illustrated in FIG. 3, the extraction module 21 extracts a brightness distribution for three pixel rows H1 to H3 in the horizontal direction and three pixel rows V1 to V3 in the vertical direction in the captured image I. With this process, the brightness distribution can be handled as two-dimensional information, and process loads at the subsequent stages can be reduced.

The pixel rows to be extracted may be pixel rows in one of the horizontal direction or the vertical direction. The number of pixel rows to be extracted is not limited to three and may be two or less or four or more.

Returning to FIG. 2, the calculation module 22 is described. The calculation module 22 divides the candidate region 100, from which the exclusion region has been excluded, into unit regions each having a predetermined number of pixels as a unit, and calculates a representative value of brightness for each unit region. The method of calculating a representative value by the calculation module 22 will be described later with reference to FIG. 4 and FIG. 5.

The conversion module 23 converts the brightness of pixels in the candidate region 100 into unit brightness with a predetermined brightness range as a unit. For example, the conversion module 23 makes a conversion into unit brightness by separating parameters from 0 to 255 indicating brightness by predetermined numbers. The representative value of brightness calculated by the calculation module 22 described above can be represented by the unit brightness converted by the conversion module 23. This point is described with reference to FIG. 4 and FIG. 5.

Figure 4:
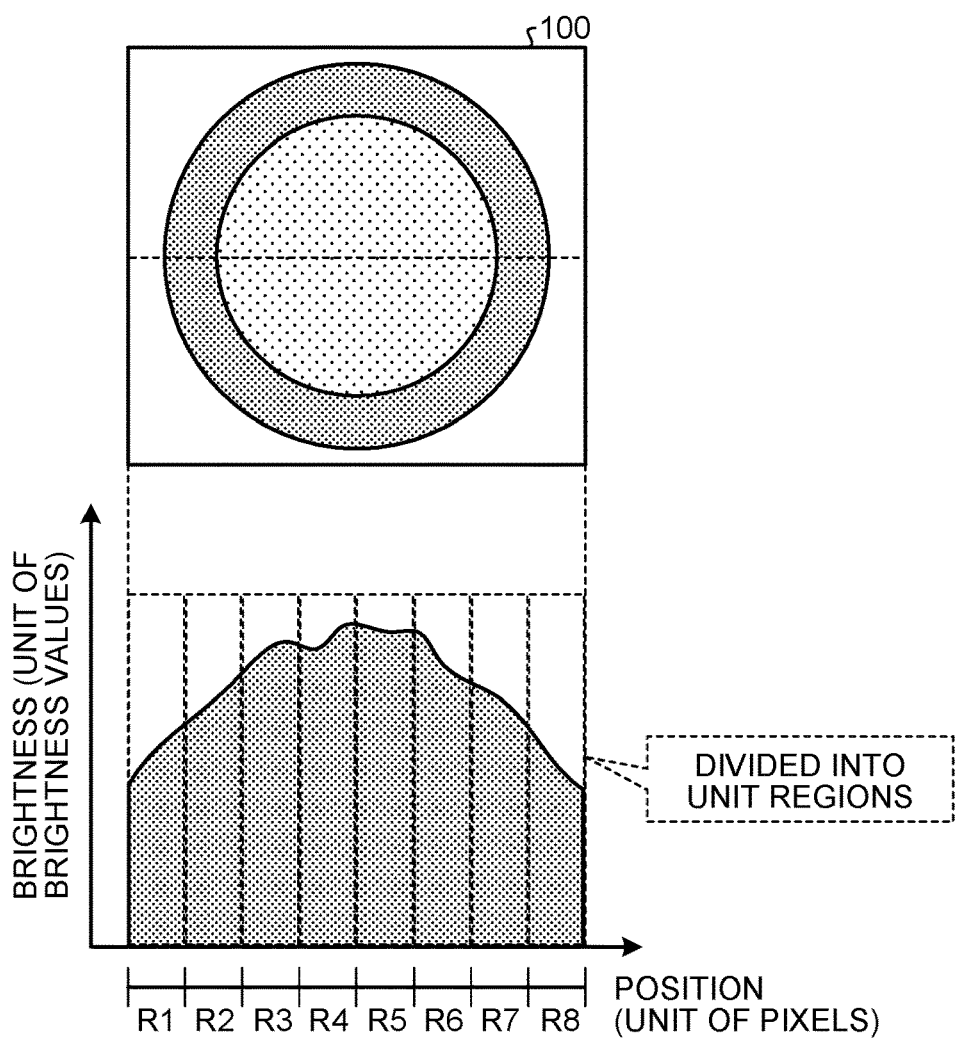
FIG. 4 is a diagram illustrating a process in a calculation module.
Figure 5:
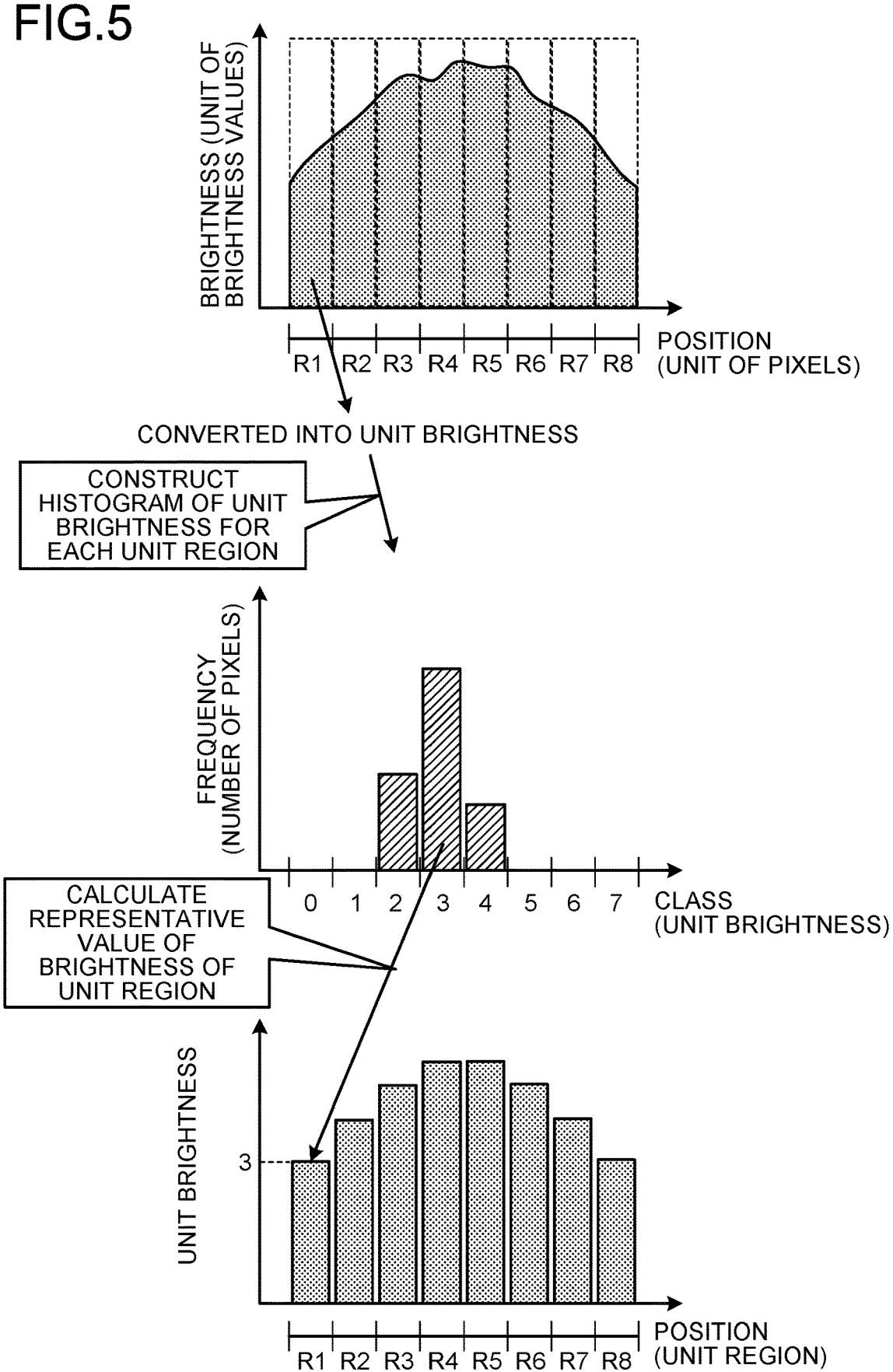
FIG. 5 is a diagram illustrating the process in the calculation module.

FIG. 4 and FIG. 5 are diagrams illustrating a process in the calculation module 22. First, referring to FIG. 4, a method of setting unit regions by the calculation module 22 is described. FIG. 4 illustrates a brightness distribution of one pixel row H in the horizontal direction.

As illustrated in FIG. 4, the calculation module 22 divides a pixel row in the horizontal direction into, for example, eight unit regions R1 to R8 (which may be collectively referred to as unit regions R). The widths (number of pixels) of the unit regions R1 to R8 may be the same (that is, the number of pixels obtained by equally dividing the pixel row), or the widths may be different from each other.

The number of divided unit regions R is not limited to eight and any number may be set. It is preferable that the number of divided unit regions R be the same (in FIG. 4, eight) in all the candidate regions 100 extracted from the captured image I, irrespective of the sizes thereof. With this process, even when the extracted candidate regions 100 have various sizes, unified information can be obtained by setting the same number of unit regions R, thereby suppressing process loads in the determination process and the like at the subsequent stages.

Subsequently, as illustrated in FIG. 5, the calculation module 22 calculates a representative value of brightness for each unit region R. As illustrated in the upper section of FIG. 5, the conversion module 23 converts the brightness value (for example, 0 to 255) of each pixel into unit brightness, prior to a calculation process for a representative value by the calculation module 22. Specifically, in FIG. 5, 0 to 255 are equally divided into eight pieces of unit brightness. The unit brightness is "0" to "7" illustrated in the middle section of FIG. 5. In this case, the width of brightness values is divided by a unit of 32. For example, the unit brightness "0" corresponds to the brightness values of 0 to 31, and the unit brightness "1" corresponds to the brightness values of 32 to 63. That is, the conversion into the unit brightness is a process of reducing the number of times of division of brightness. With this process, since the brightness of a brightness distribution can be reduced to the desired number of unit brightness, process loads at the subsequent stages can be reduced. In the conversion from brightness into unit brightness, the number of times of division and the width obtained by the division can be set as desired. The widths are not necessarily equal as described above.

The calculation module 22 then constructs a histogram of unit brightness for each of the unit regions R1 to R8. The middle section of FIG. 5 illustrates a histogram of one unit region R1, in which the class is unit brightness of "0" to "7", and the frequency is the number of pixels.

As illustrated in the lower section of FIG. 5, the calculation module 22 calculates a representative value of brightness for each of the unit regions R1 to R8 based on the constructed histogram. For example, the calculation module 22 calculates the unit brightness of the class with the mode (in FIG. 5, class "3") in the histogram as a representative value of brightness in the unit region R1. This process can reduce the number of pieces of data of the brightness distribution from the number of pixels to the number of unit regions R, thereby reducing process loads at the subsequent stages.

The calculation module 22 uses the unit brightness with the mode as a representative value. However, the embodiment is not limited thereto and, for example, the median value or the average value in the histogram may be used as a representative value.

The calculation process is not limited to a representative value based on a histogram, and the calculation module 22 may calculate, for example, the average value of brightness values for each unit region R and use the unit brightness corresponding to such an average value as a representative value of brightness.

Although the calculation module 22 uses the unit brightness as a representative value, for example, the average value of brightness values in the unit region R may be used as it is as a representative value. That is, the representative value may be represented by unit brightness or may be represented by a brightness value.

Figure 6:
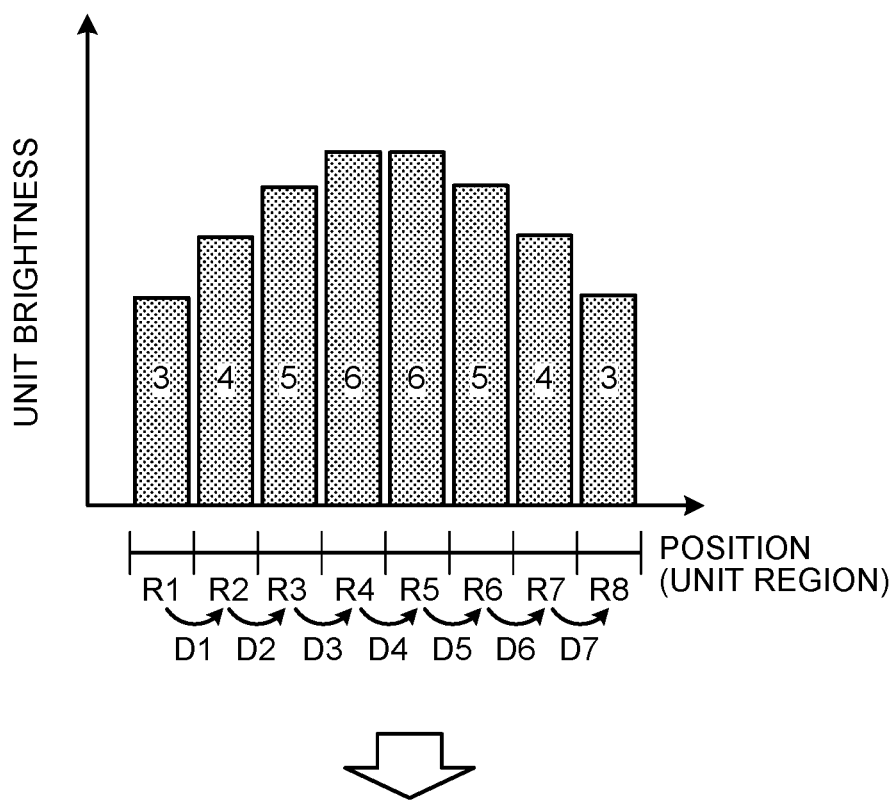
FIG. 6 is a diagram illustrating the process in the calculation module.

As illustrated in FIG. 6, the calculation module 22 calculates the amounts of change D1 to D7 in unit brightness of the unit regions R1 to R8 adjacent to each other. FIG. 6 is a diagram illustrating the process in the calculation module 22. The upper section of FIG. 6 illustrates a brightness distribution in one candidate region 100, in which the representative value for each of the unit regions R1 to R8 is illustrated with a white outline in a bar.

Specifically, the calculation module 22 obtains the difference in unit brightness between adjacent unit regions as the amount of change. That is, how much change in brightness occurs between adjacent unit regions is calculated as the amount of change. Although the difference is simply obtained here, the method is not limited thereto. For example, a continuous function representing the brightness distribution may be generated by a variety of interpolation methods, and a derivative value thereof may be calculated as the amount of change. The lower section of FIG. 6 illustrates a table in which respective values of the amounts of change D1 to D7 are entered.

A pattern of the amounts of change D1 to D7 is a pattern of undulation change in brightness distribution. That is, the pattern of undulation change in brightness distribution is the pattern of the amounts of change D1 to D7 in unit brightness of the adjacent unit regions R1 to R8.

As the undulation information of a brightness distribution, the pattern of undulation change in brightness distribution stored in the adhesion candidate information DB 31 may be the unit brightness of the unit regions R1 to R8.

Returning to FIG. 2, the exclusion module 24 excludes an exclusion region that satisfies a predetermined exception condition from the candidate region 100 extracted by the extraction module 21. Specifically, when the deposit detection flag is "OFF", the exclusion module 24 excludes an exclusion region that satisfies the first exception condition from the candidate region 100. When the deposit detection flag is "ON", the exclusion module 24 excludes an exclusion region that satisfies the second exception condition from the candidate region 100. The first exception condition and the second exception condition will be described later.

The determination module 25 determines whether the deposit detection flag is "ON" or "OFF". The determination module 25 also determines whether the candidate region 100 satisfies a predetermined exception condition (the first exception condition and the second exception condition).

When the deposit detection flag is "OFF", the determination module 25 determine whether the candidate region 100 satisfies the first exception condition. The determination module 25 determines whether the first exception condition is satisfied, for all the candidate regions 100 extracted by the extraction module 21. The first exception condition is a condition for preventing erroneous detection due to road surface reflection.

Figure 7:
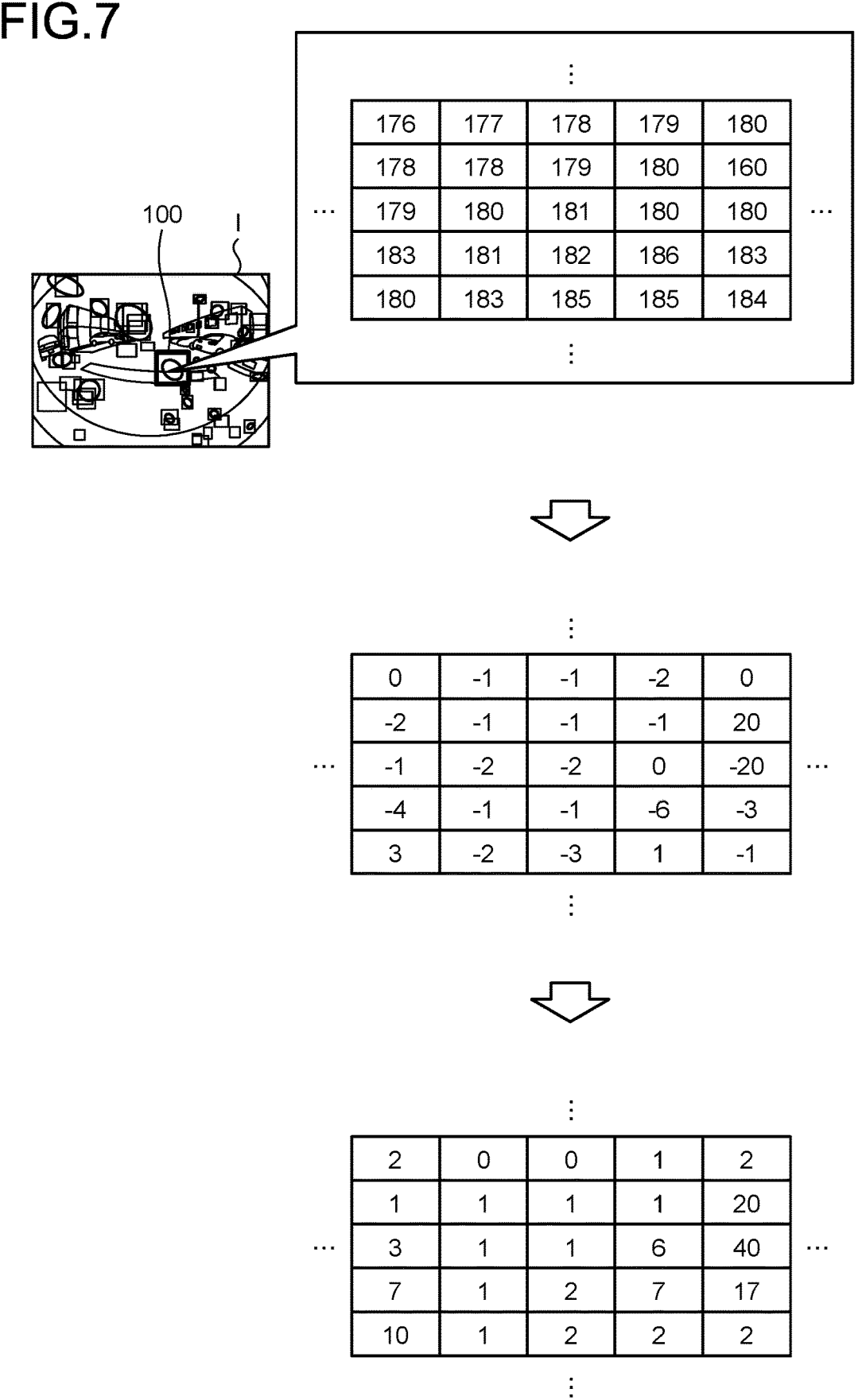
FIG. 7 is a diagram illustrating a first exception condition.

The first exception condition will now be described with reference to FIG. 7. FIG. 7 is a diagram illustrating the first exception condition.

The determination module 25 calculates the difference between brightness values adjacent in the Y-axis direction, as illustrated in the middle section of FIG. 7, for the brightness values in the central portion of the candidate region 100 illustrated in the upper section of FIG. 7. The determination module 25 further calculates the amount of change between differences adjacent in the Y-axis direction, as illustrated in the lower section of FIG. 7, for the calculated differences. The amount of change in difference is the absolute value.

Figures 8, 9:
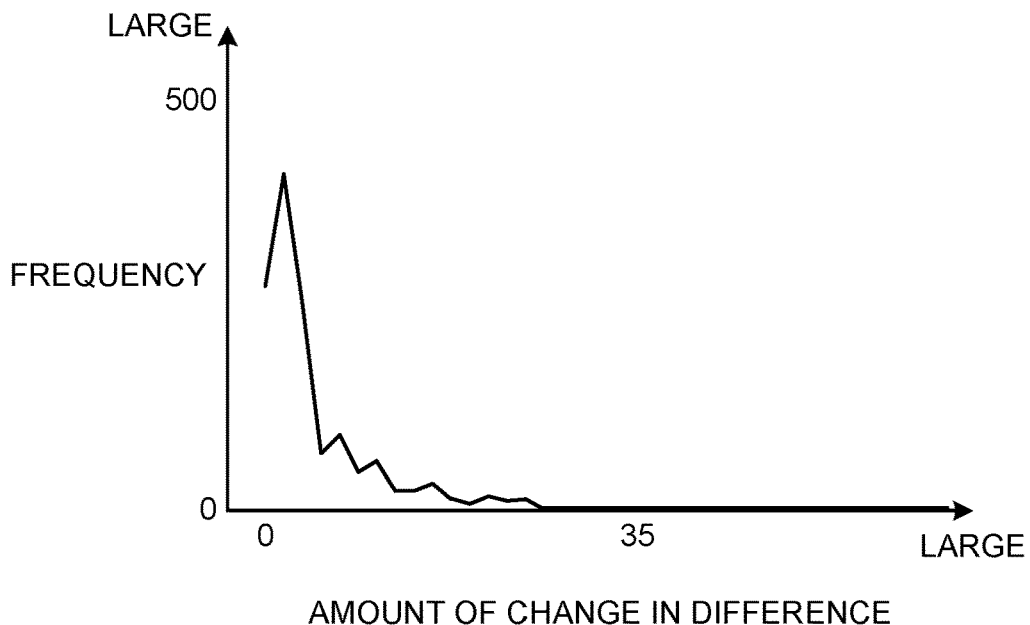
FIG. 8 is a diagram illustrating a histogram obtained by normalizing the amount of change in difference.
FIG. 9 is a diagram illustrating a process in a determination module.

The determination module 25 then performs normalization such that the frequency sum is a predetermined number (for example, 1000) and constructs a histogram as illustrated in FIG. 8. FIG. 8 is a diagram illustrating a histogram obtained by normalizing the amounts of change in difference. In the histogram illustrated in FIG. 8, the horizontal axis represents the amount of change in difference and the vertical axis represents the frequency. The determination module 25 calculates the frequencies of the amount of change in difference equal to or larger than 35, as the frequency sum, and, if the frequency sum is equal to or larger than 5, determines that the first exception condition is satisfied. The candidate region 100 with a frequency sum equal to or larger than 5 is a region in which the center of the candidate region 100 is bright and road surface reflection is captured. The candidate region 100 with a frequency sum equal to or larger than 5 is therefore an exclusion region and excluded by the exclusion module 24 described above.

Here, the frequency sum using the amount of change in difference is calculated, and whether the candidate region 100 is a region in which road surface reflection is captured is determined. This is because the possibility of being a region of road surface reflection is high when the brightness abruptly changes and the change in brightness value is large from the "+" direction to the "−" direction or from the "−" direction to the "+" direction. Calculating the amount of change in difference indicates the directivity of change in brightness value and enables accurate determination as to whether the candidate region 100 is a region in which road surface reflection is captured.

For example, in the middle section of FIG. 7, when the change in brightness value on the right side is "0"→"20"→"−20"→"−3"→"−1", the amount of change in difference is "20"→"40"→"17"→"2". In this way, a large change in brightness value can be detected by calculating the amount of change in difference. Thus, whether the candidate region 100 is a region in which road surface reflection is captured can be determined accurately by calculating the frequency sum of the amounts of change in difference.

In this way, the determination module 25 determines whether a feature based on brightness information in the central portion of the candidate region 100 matches an erroneous detection feature. Then, an exclusion region in which the feature based on the brightness information in the central portion of the candidate region 100 matches the erroneous detection feature is excluded by the exclusion module 24.

On the other hand, the determination module 25 determines that the first exception condition is not satisfied when the frequency sum is less than 5. The candidate region 100 with a frequency sum less than 5 is not an exclusion region and not excluded by the exclusion module 24 described above.

When the deposit detection flag is "ON", the determination module 25 determines whether the candidate region 100 satisfies the second exception condition. The determination module 25 determines whether the second exception condition is satisfied, for all the candidate regions 100 extracted by the extraction module 21.

The determination module 25 determines that the second exception condition is satisfied when the adhesion candidate information of the candidate region 100 does not match the adhesion candidate information stored in the adhesion candidate information DB 31. The second exception condition is a condition in which the exception condition is relaxed compared with the first exception condition.

Specifically, the determination module 25 determines that the second exception condition is satisfied when the rectangular information of the candidate region 100 does not match the rectangular information stored in the adhesion candidate information DB 31 or when the undulation information of the brightness distribution of the candidate region 100 does not match the undulation information of the brightness distribution stored in the adhesion candidate information DB 31. The candidate region 100 that satisfies the second exception condition is an exclusion region and excluded by the exclusion module 24 described above.

On the other hand, the determination module 25 determines that the second exception condition is not satisfied when the adhesion candidate information of the candidate region 100 matches the adhesion candidate information stored in the adhesion candidate information DB 31.

Specifically, the determination module 25 determines that the second exception condition is not satisfied when the rectangular information of the candidate region 100 matches the rectangular information stored in the adhesion candidate information DB 31 and when the undulation pattern of the brightness distribution of the candidate region 100 matches the undulation pattern of the brightness distribution stored in the adhesion candidate information DB 31. The candidate region 100 that does not satisfy the second exception condition is not an exclusion region and not excluded in the exclusion module 24 described above. That is, when the candidate region 100 of the same shape is extracted at the same position in the captured image I, the extracted candidate region 100 is not excluded.

The determination module 25 determines whether the candidate region 100 is a deposit region based on the undulation of the brightness distribution of the pixels included in the candidate region 100. Of the candidate regions 100 extracted by the extraction module 21, the determination module 25 determines whether the candidate region 100 from which the exclusion region has been excluded by the exclusion module 24 is a deposit region.

The determination module 25 determines that the candidate region 100 is a deposit region when the pattern of undulation change in brightness distribution satisfies a predetermined change pattern.

The predetermined change pattern is stored as undulation condition information in the undulation condition information DB 30 in the storage unit 3. The predetermined pattern includes respective threshold value ranges of the amounts of change D1 to D7 and is stored, for example, in the form of a table illustrated in the upper section of FIG. 9. A plurality of predetermined change patterns are stored. FIG. 9 is a diagram illustrating the determination process by the determination module 25. The lower section of FIG. 9 illustrates a table in which the values of the amounts of change D1 to D7 in the candidate region 100 are entered.

The determination module 25 performs the determination process by comparing the values of the amounts of change D1 to D7 in the candidate region 100 with the undulation condition information stored in the storage unit 3. The determination module 25 determines that the candidate region 100 is a deposit region when each of the amounts of change D1 to D7 in the candidate region 100 falls within a threshold value range of the corresponding one of the amounts of change D1 to D7 set in the undulation condition information.

In other words, the determination module 25 determines that the candidate region 100 is a deposit region when the pattern of the amounts of change D1 to D7 in unit brightness of the adjacent unit regions R1 to R8 satisfies the change pattern that is the threshold value ranges set in the undulation condition information.

The determination module 25 can ignore the overall magnitude of brightness values by using the amounts of change D1 to D7 and therefore can reduce erroneous determination caused when the shape of undulation is similar and the magnitude of brightness values is different. Since the magnitude of brightness values can be ignored, there is no need for setting a determination condition for each brightness value, leading to reduction in the storage capacity for storing the conditions, and there is no need for performing the determination process for each brightness value, leading to reduction in processing volume.

Since the maximum and the minimum of the amounts of change D1 to D7 are set to provide a range in the undulation condition information, a deposit region can be detected even when a deposit is deformed. That is, even when the shape of a deposit varies, a deposit region can be detected with high accuracy.

FIG. 9 illustrates the case where the threshold value ranges are set for all the amounts of change D1 to D7 for the undulation condition information. However, when a deposit region having a small size is to be detected, the threshold value range may be set for only some of the amounts of change D1 to D7.

FIG. 9 illustrates the case where the determination module 25 performs the determination by whether the threshold value ranges of the amounts of change D1 to D7 fall within the threshold value ranges of the undulation condition information. However, for example, the determination process may be performed based on the undulation condition information in which the undulation of the brightness distribution is mapped based on the threshold value ranges of the amounts of change D1 to D7. This point is described with reference to FIG. 10.

Figure 10:
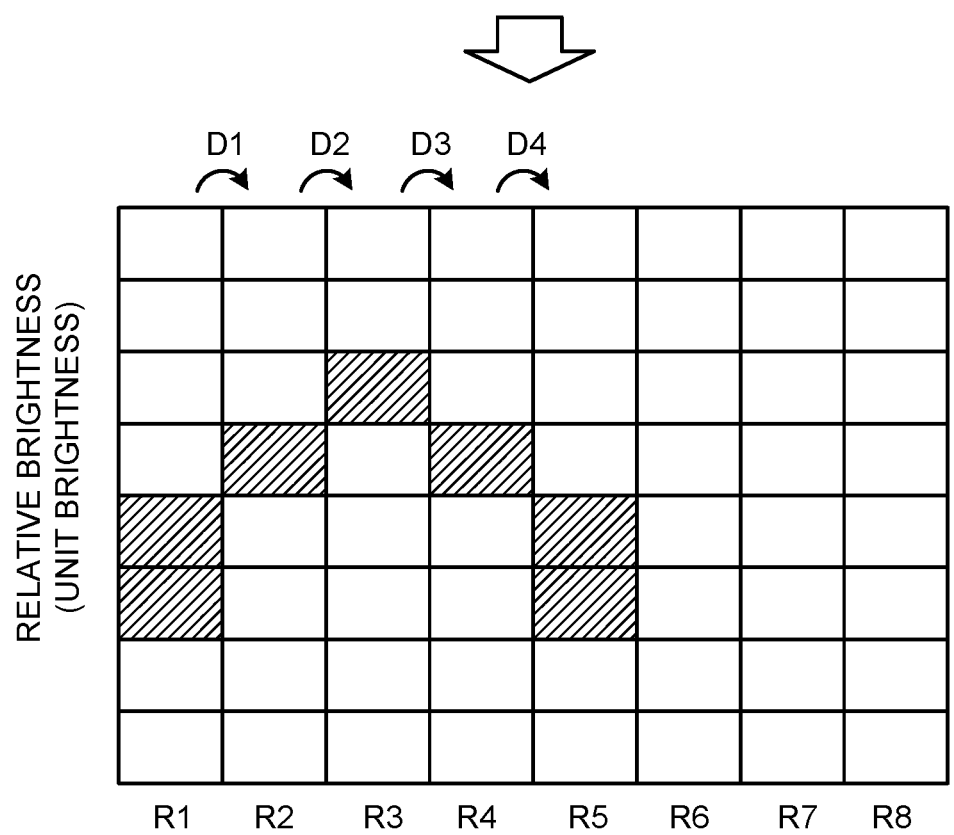
FIG. 10 is a diagram illustrating the process in the determination module.

The upper section of FIG. 10 illustrates the threshold value ranges of the amounts of change of the undulation change in brightness distribution, and the lower section of FIG. 10 illustrates the undulation condition information in which the threshold value ranges of the amounts of change D1 to D4 illustrated in the upper section of FIG. 10 are mapped. Specifically, illustrated is a map in which the horizontal axis represents the positions of the unit regions R1 to R8 and the vertical axis represents relative brightness. Such a map is generated in advance.

For example, since the amount of change D1 is within a threshold value range of +1 to +2, two cells at a predetermined position of the relative brightness are set as threshold values for the unit region R1. Then, for the unit region R2, one cell at a position that satisfies the threshold value range of the amount of change D1 is set as a threshold value. Next, since the amount of change D2 has a value of +1, a cell of the unit region R3, one cell up from the cell set for the unit region R2, is set as a threshold value. Next, since the amount of change D3 has a value of −1, a cell of the unit region R4, one cell down from the cell set for the unit region R3, is set as a threshold value. Next, since the amount of change D4 has a threshold value range of −2 to −1, two cells of the unit region R5, one cell and two cells down from the cell set for the unit region R4, are set as threshold values. The map of the undulation condition information is thus completed.

That is, the map in the undulation condition information is information representing the undulation shape of the unit brightness in the unit regions R1 to R5 based on the amounts of change D1 to D4. For the unit regions R6 to R8, since the threshold value ranges for the amounts of change D5 to D7 are not set, the detected brightness may be arbitrary. A plurality of patterns of such undulation condition information and maps are prepared in advance. Although FIG. 10 illustrates the undulation condition information in a convex shape, undulation condition information and maps in a concave shape are also prepared.

The determination module 25 creates a map based on the amounts of change D1 to D7 of the unit regions R1 to R8 in the extracted candidate region 100 by a method similar to the one described above, performs a process of matching with the aforementioned map in the undulation condition information, and, if both maps match each other, determines as being a deposit region.

In the example illustrated in FIG. 10, when the map based on the candidate region 100 has a convex shape as in the map of the undulation condition information, the determination module 25 determines that the candidate region 100 is a deposit region that is a blurred region becoming darker from the center to the periphery. On the other hand, when the map based on the candidate region 100 has a concave shape as in the map of the undulation condition information, the determination module 25 determines that the candidate region 100 is a deposit region that is a blurred region becoming brighter from the center to the periphery.

That is, when the undulation of the brightness distribution in the candidate region 100 has a convex shape or a concave shape, the determination module 25 determines that the candidate region 100 is a deposit region. Thus, the determination process can be performed only on the undulation shape excluding elements of brightness values (unit brightness), so that missing detection due to the magnitude of brightness values can be reduced. A deposit therefore can be detected with high accuracy.

In addition, when the candidate region 100 is successively determined as a deposit region, based on the time-series captured images I, the determination module 25 determines that the candidate region 100 is the identified region of a deposit region.

The determination module 25 also performs a final determination for a deposit by calculating the occupancy ratio of the identified region. Specifically, the determination module 25 determines that a deposit adheres to the lens of the camera 10 when the occupancy ratio is equal to or larger than a preset threshold value (for example, 40%). The determination module 25 determines that a deposit does not adhere to the lens of the camera 10 when the occupancy ratio is smaller than the threshold value.

The updating module 26 sets the deposit detection flag to "ON" when it is determined that a deposit adheres to the lens of the camera 10. The updating module 26 sets the deposit detection flag to "OFF" when it is determined that a deposit does not adhere to the lens of the camera 10.

The updating module 26 also updates the adhesion candidate information DB 31. The updating module 26 newly stores adhesion candidate information when the deposit detection flag is "ON" and the adhesion candidate information in the identified region is not stored in the adhesion candidate information DB 31.

When the deposit detection flag is "ON" and the candidate region 100 having adhesion candidate information that matches the adhesion candidate information stored in the adhesion candidate information DB 31 is not detected successively a predetermined number of times (for example, three times), the updating module 26 deletes the adhesion candidate information not matched, from the adhesion candidate information DB 31. That is, the updating module 26 deletes, from the adhesion candidate information DB 31, the adhesion candidate information that does not match the adhesion candidate information of the candidate region 100 in the captured image I successively a predetermined number of times when the deposit detection flag is "ON".

The updating module 26 may delete the adhesion candidate information from the adhesion candidate information DB 31, based on the rectangular information of the adhesion candidate information. Specifically, when the deposit detection flag is "ON" and the candidate region 100 having rectangular information that matches the rectangular information of the adhesion candidate information stored in the adhesion candidate information DB 31 is not detected successively a predetermined number of times (for example, three times), the updating module 26 deletes the adhesion candidate information not matched, from the adhesion candidate information DB 31.

The detection module 27 detects a deposit region from the candidate region 100, based on the determination result by the determination module 25. The detection module 27 detects an identified region of a deposit region, based on the determination result by the determination module 25.

Figure 11:
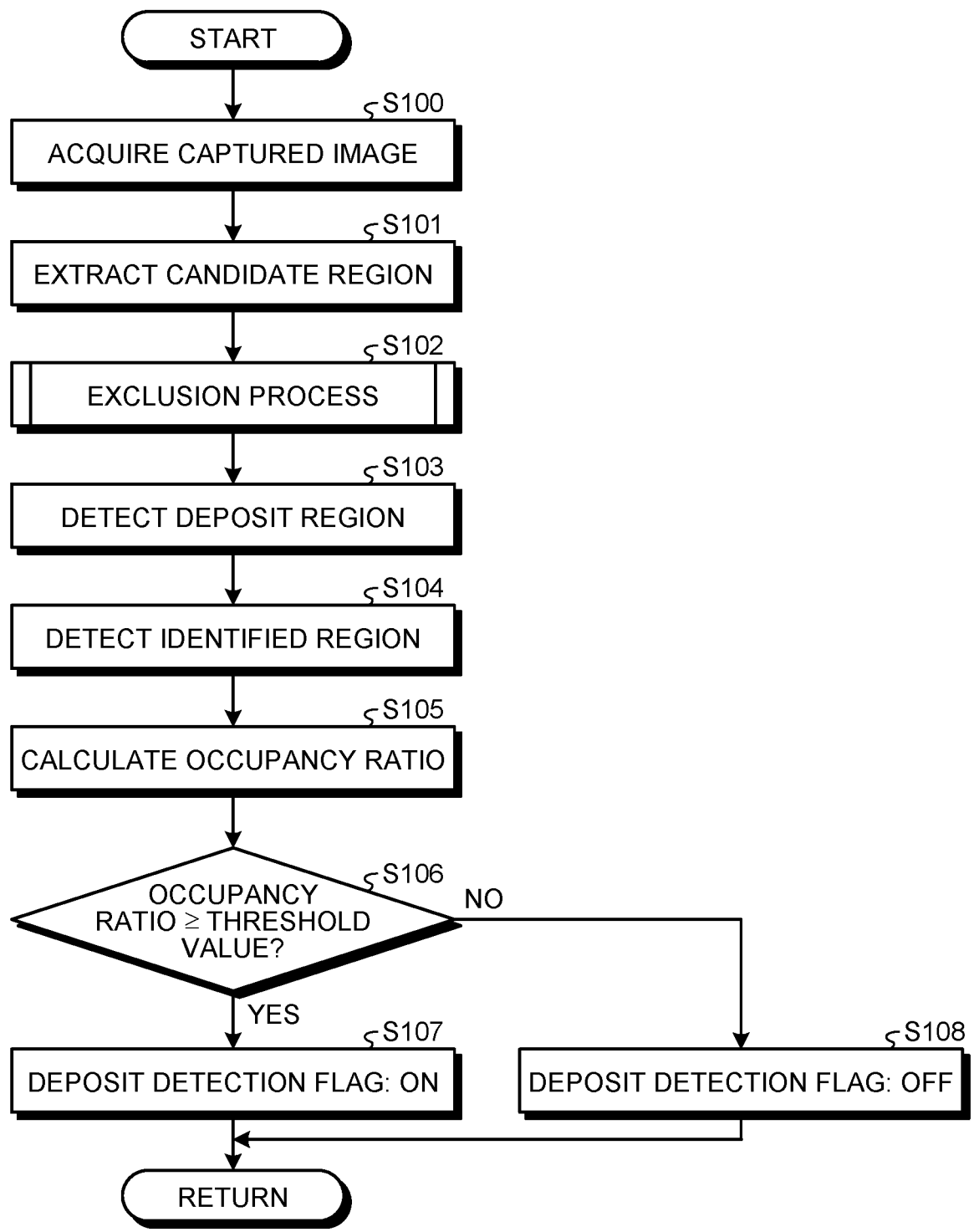
FIG. 11 is a flowchart illustrating a deposit detection process according to an embodiment.

A deposit detection process according to the embodiment will now be described with reference to FIG. 11. FIG. 11 is a flowchart illustrating the deposit detection process according to the embodiment.

The control unit 2 acquires an image captured by the camera 10 and performs a gray-scale process and a thinning process on the acquired image, and thereafter acquires an integrated image generated based on pixel values of the reduced image as a captured image I (S100).

The control unit 2 extracts a candidate region 100 for a deposit region corresponding to a deposit adhering to the camera 10, based on edge information detected from the pixels of the captured image I (S101).

The control unit 2 performs an exclusion process of excluding an exclusion region from the extracted candidate region 100 (S102), detects a deposit region from the candidate region 100 from which the exclusion region has been excluded (S103), and detects an identified region of a deposit region (S104).

The control unit 2 calculates the occupancy ratio (S105) and determines whether the occupancy ratio is equal to or larger than a threshold value (S106). If the occupancy ratio is equal to or larger than the threshold value (Yes at S106), the control unit 2 sets the deposit detection flag to "ON" (S107). If the occupancy ratio is smaller than the threshold value (No at S106), the control unit 2 sets the deposit detection flag to "OFF" (S108).

Figure 12:
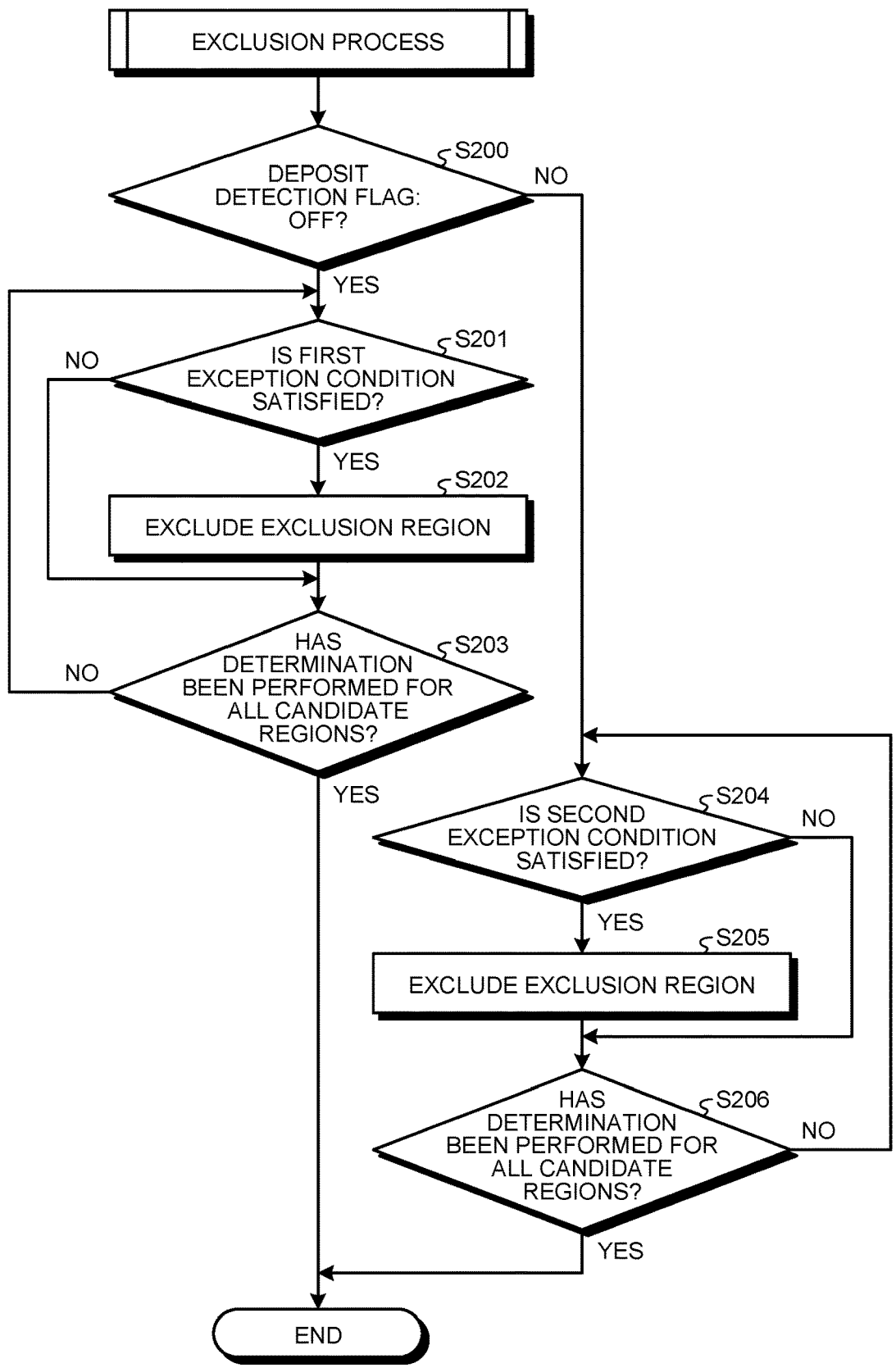
FIG. 12 is a flowchart illustrating an exclusion process according to the embodiment.

The exclusion process according to the embodiment will now be described with reference to FIG. 12. FIG. 12 is a flowchart illustrating the exclusion process according to the embodiment.

The control unit 2 determines whether the deposit detection flag is "OFF" (S200). If the deposit detection flag is "OFF" (Yes at S200), the control unit 2 determines whether the candidate region 100 satisfies the first exception condition (S201). If the candidate region 100 satisfies the first exception condition (Yes at S201), the control unit 2 excludes the candidate region 100 as an exclusion region (S202).

The control unit 2 determines whether the determination as to whether the first exception condition is satisfied has been performed for all of the extracted candidate regions 100 (S203). If there exists a candidate region 100 not subjected to the determination as to whether the first exception condition is satisfied, the control unit 2 determines whether the first exception condition is satisfied, for the candidate region 100 not subjected to the determination as to whether the first exception condition is satisfied (S201).

If the deposit detection flag is "ON" (No at S200), the control unit 2 determines whether the candidate region 100 satisfies the second exception condition (S204). If the candidate region 100 satisfies the second exception condition (Yes at S204), the control unit 2 excludes the candidate region 100 as an exclusion region (S205).

The control unit 2 determines whether the determination as to whether the second exception condition is satisfied has been performed for all of the extracted candidate regions 100 (S206). If there exists a candidate region 100 not subjected to the determination as to whether the second exception condition is satisfied, the control unit 2 determines whether the second exception condition is satisfied, for the candidate region 100 not subjected to the determination as to whether the second exception condition is satisfied (S204).

The deposit detection device 1 extracts a candidate region 100 for a deposit from the captured image I and, if the deposit detection flag is "OFF", excludes an exclusion region that satisfies the first exception condition from the extracted candidate region 100. If the deposit detection flag is "ON", the deposit detection device 1 excludes the exclusion region that satisfies the second exception condition from the extracted candidate region 100.

The deposit detection device 1 thus can suppress frequent changing of the adhesion determination for a deposit on the lens of the camera 10 and can stabilize deposit detection.

The deposit detection device 1 relaxes the second exception condition compared with the first exception condition and excludes an exclusion region from the candidate region 100.

With this process, the deposit detection device 1 can suppress exclusion of the candidate region 100 as an exclusion region due to erroneous detection when the deposit detection flag is "ON" and can suppress turning "OFF" of the deposit detection flag.

When the deposit detection flag is "OFF", the deposit detection device 1 excludes from the candidate region 100 an exclusion region in which the feature based on brightness information in the central portion of the candidate region 100 matches the erroneous detection feature.

With this process, the deposit detection device 1 can exclude from the candidate region 100 a region extracted due to the effect of road surface reflection and can improve accuracy in deposit detection.

When the deposit detection flag is "ON", the deposit detection device 1 excludes from the candidate region 100 an exclusion region having adhesion candidate information that does not match the adhesion candidate information stored in the adhesion candidate information DB 31.

Specifically, the deposit detection device 1 excludes from the candidate region 100 an exclusion region that does not match the rectangular information of the candidate region 100 and the undulation information of the brightness distribution of the candidate region 100 stored in the adhesion candidate information DB 31. That is, the deposit detection device 1 does not exclude from the candidate region 100 a region that matches the rectangular information of the candidate region 100 and the undulation information of the brightness distribution of the candidate region 100 stored in the adhesion candidate information DB 31.

With this process, the deposit detection device 1 can suppress exclusion of a region having a feature of the same shape at the same position of the captured image I from the candidate region 100 and can suppress turning "OFF" of the deposit detection flag.

The deposit detection device 1 deletes from the adhesion candidate information DB 31 the adhesion candidate information that does not match the adhesion candidate information of the candidate region 100 extracted from the acquired captured image I successively a predetermined number of times.

With this process, the deposit detection device 1 can suppress selection, based on inappropriate adhesion candidate information, of the candidate region 100. The deposit detection device 1 therefore can reduce the process loads. The deposit detection device 1 can also improve the accuracy in deposit detection. When the candidate region 100 is erroneously detected, the deposit detection device 1 can suppress deletion of the adhesion candidate information from the adhesion candidate information DB 31 based on the erroneously extracted information.

The deposit detection device 1 according to a modification may exclude an exclusion region that satisfies the above first exception condition or second exception condition from the candidate region 100 when the vehicle speed is equal to or lower than a predetermined low speed (for example, 15 km/h).

If a region that satisfies the first exception condition is excluded as an exclusion region from the candidate region 100 when the vehicle speed is low, the deposit detection flag is more frequently changed from "ON" to "OFF". This is because when the vehicle speed is low, the candidate region 100 is more likely to be excluded due to the effect of road surface reflection.

On the contrary, the deposit detection device 1 according to the modification applies the process described above when the vehicle speed is low to suppress erroneous changing of the deposit detection flag from "ON" to "OFF".

As described above, according to an aspect of the embodiment, stable deposit detection can be performed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A deposit detection device comprising:
an extraction module configured to extract a candidate region for a deposit from a captured image captured by an imaging device; and
an exclusion module configured to exclude from the candidate region a region that satisfies a predetermined exception condition, wherein
the exclusion module
excludes from the candidate region a region that satisfies a first exception condition when adhesion of the deposit to the imaging device is not detected, and
excludes from the candidate region a region that satisfies a second exception condition different from the first exception condition when adhesion of the deposit to the imaging device is detected.

2. The deposit detection device according to claim 1, wherein when adhesion of the deposit to the imaging device is detected, the exclusion module excludes from the candidate region a region that satisfies the second exception condition in which an exception condition is relaxed compared with the first exception condition.

3. The deposit detection device according to claim 1, wherein when adhesion of the deposit to the imaging device is not detected, the exclusion module excludes from the candidate region a region in which a feature based on brightness information in a central portion of the candidate region matches an erroneous detection feature.

4. The deposit detection device according to claim 1, the deposit detection device further comprising a storage unit configured to store therein adhesion candidate information of the candidate region in a past captured image in which adhesion of the deposit to the imaging device was detected, and
when adhesion of the deposit to the imaging device is detected, the exclusion module excludes from the candidate region a region in which the adhesion candidate information stored in the storage unit does not match adhesion candidate information in a captured image at present.

5. The deposit detection device according to claim 4, wherein
the storage unit stores therein, as the adhesion candidate information, undulation information of a brightness distribution of the candidate region in the past captured image and rectangular information of the candidate region in the past captured image, and
when adhesion of the deposit to the imaging device is detected, the exclusion module excludes from the candidate region a region in which the undulation information and the rectangular information stored in the storage unit do not match undulation information and rectangular information in a captured image at present.

6. The deposit detection device according to claim 4, the deposit detection device further comprising an updating module configured to delete from the storage unit the adhesion candidate information that does not match adhesion candidate information of a candidate region in the captured image successively a predetermined number of times.

7. The deposit detection device according to claim 1, wherein when a speed of a vehicle equipped with the imaging device is equal to or lower than a predetermined low speed, the exclusion module excludes from the candidate region a region that satisfies the predetermined exception condition.

8. A deposit detection method comprising:
extracting a candidate region for a deposit from a captured image captured by an imaging device; and
excluding from the candidate region a region that satisfies a predetermined exception condition, wherein
at the excluding,
when adhesion of the deposit to the imaging device is not detected, a region that satisfies a first exception condition is excluded from the candidate region, and
when adhesion of the deposit to the imaging device is detected, a region that satisfies a second exception condition different from the first exception condition is excluded from the candidate region.

* * * * *